US006266398B1

(12) United States Patent
Nguyen

(10) Patent No.: US 6,266,398 B1
(45) Date of Patent: *Jul. 24, 2001

(54) METHOD AND APPARATUS FOR FACILITATING SPEECH BARGE-IN IN CONNECTION WITH VOICE RECOGNITION SYSTEMS

(75) Inventor: John N. Nguyen, Belmont, MA (US)

(73) Assignee: Speechworks International, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/041,419

(22) Filed: Mar. 12, 1998

Related U.S. Application Data

(62) Division of application No. 08/651,889, filed on May 21, 1996, now Pat. No. 5,765,130.

(51) Int. Cl.[7] .......... H04M 1/64

(52) U.S. Cl. .......... 379/88.01; 379/406; 704/233

(58) Field of Search .......... 379/88.01, 88.04, 379/88.07, 88.08, 88.16, 88.24, 208, 351, 406, 407, 410, 411, 88.03, 88.27, 88.28; 704/275, 273, 251, 246, 270, 233, 253, 214, 248, 228

(56) References Cited

U.S. PATENT DOCUMENTS

| | | | |
|---|---|---|---|
| 4,410,763 | * 10/1983 | Strawczynski et al. | 704/214 |
| 4,914,692 | * 4/1990 | Hartwell et al. | 379/410 |
| 5,125,024 | * 6/1992 | Gokeen et al. | 379/88.01 |
| 5,349,636 | * 9/1994 | Irribarren | 379/88.15 |
| 5,434,916 | * 7/1995 | Hasegawa | 379/406 |
| 5,475,791 | * 12/1995 | Schalk et al. | 704/233 |
| 5,577,097 | * 11/1996 | Meek | 379/3 |
| 5,765,130 | * 6/1998 | Nguyen | 704/233 |
| 5,978,763 | * 11/1999 | Bridges | 704/233 |

OTHER PUBLICATIONS

Merriam Webster's Collegiate Dictionary, 10th Ed., 1997, Merriam–Webster, Inc., ISBN 0–87779–709–9.*

* cited by examiner

*Primary Examiner*—Fan Tsang
*Assistant Examiner*—Roland G. Foster
(74) *Attorney, Agent, or Firm*—Hale and Dorr LLP

(57) ABSTRACT

A barge-in detector for use in connection with a speech recognition system forms a prompt replica for use in detecting the presence or absence of user input to the system. The replica is indicative of the prompt energy applied to an input of the system. The detector detects the application of user input to the system, even if concurrent with a prompt, and enables the system to quickly respond to the user input.

16 Claims, 2 Drawing Sheets

10

METHOD AND APPARATUS FOR FACILITATING SPEECH BARGE-IN IN CONNECTION WITH VOICE RECOGNITION SYSTEMS

This application is a divisional of Ser. No. 08/651,889 filed May 21, 1996 U.S. Pat. No. 5,765,130.

BACKGROUND OF THE INVENTION

A. Field of the Invention

The invention relates to speaker barge-in in connection with voice recognition systems, and comprises method and apparatus for detecting the onset of user speech on a telephone line which also carries voice prompts for the user.

B. Prior Art

Voice recognition systems are increasingly forming part of the user interface in many applications involving telephonic communications. For example, they are often used to both take and provide information in such applications as telephone number retrieval, ticket information and sales, catalog sales, and the like. In such systems, the voice system distinguishes between speech to be recognized and background noise on the telephone line by monitoring the signal amplitude, energy, or power level on the line and initiating the recognition process when one or more of these quantities exceeds some threshold for a predetermined period of time, e.g., 50 ms. In the absence of interfering signals, speech onset can usually be detected reliably and within a very brief period of time.

Frequently telephonic voice recognition systems produce voice prompts to which the user responds in order to direct subsequent choices and actions. Such prompts may take the form of any audible signal produced by the voice recognition system and directed at the user, but frequently comprise a tone or a speech segment to which the user is to respond in some manner. For some users, the prompt is unnecessary, and the user frequently desires to "barge in" with a response before the prompt is completed. In such circumstances, the signal heard by the voice recognition system or "recognizer " then includes not only the user's speech but its own prompt as well. This is due to the fact that, in telephone operation, the signal applied to the outgoing line is also fed back, usually with reduced amplitude, to the incoming line as well, so that the user can hear his or her own voice on the telephone during its use.

The return portion of the prompt is referred to as an "echo" of the prompt. The delay between the prompt and its "echo" is on the order of microseconds and thus, to the user, the prompt appears not as an echo but as his or her own contemporaneous conversation. However, to a speech recognition system attempting to recognize sound on the input line, the prompt echo appears as interference which masks the desired speech content transmitted to the system over the input line from a remote user.

Current speech recognition systems that employ audible prompts attempt to eliminate their own prompt from the input signal so that they can detect the remote user's speech more easily and turn off the prompt when speech is detected. This is typically done by means of local "echo cancellation", a procedure similar to, and performed in addition to, the echo cancellation utilized by the telephone company elsewhere in the telephone system. See, e.g., "A Single Chip VLSI Echo Canceler", The Bell System Technical Journal, vol. 59, no. 2, February 1980. Speech recognition systems have also been proposed which subtract a system-generated audio signal broadcast by a loudspeaker from a user audio signal input to a microphone which also is exposed to the speaker output. See, for example, U.S. Pat. No. 4,825,384, "Speech Recognizer," issued Apr. 25, 1989 to Sakurai et al. Systems of this type act in a manner similar to those of local echo cancellers, i.e., they merely subtract the system-generated signal from the system input.

Local echo cancellation is helpful in reducing the prompt echo on the input line, but frequently does not wholly eliminate it. The component of the input signal arising from the prompt which remains after local echo cancellation is referred to herein as "the prompt residue". The prompt residue has a wide dynamic range and thus requires a higher threshold for detection of the voice signal than is the case without echo residue; this, in turn, means that the voice signal often will not be detected unless the user speaks loudly, and voice recognition will thus suffer. Separating the user's voice response from the prompt is therefore a difficult task which has hitherto not been well handled.

SUMMARY OF THE INVENTION

A. Objects of the Invention

Accordingly, it is an object of the invention to provide a method and apparatus for implementing barge-in capabilities in a voice-response system that is subject to prompt echoes.

Further, it is an object of the invention to provide a method and apparatus for implementing barge-in a telephonic voice-response system.

Another object of the invention is to provide a method and apparatus for quickly and reliably detecting the onset of speech in a voice-recognition system having prompt echoes superimposed on the speech to be detected.

Yet another object of the invention is to provide a method and apparatus for readily detecting the occurrence of user speech or other user signaling in a telephone system during the occurrence of a system prompt.

B. Brief Description of the Preferred Embodiment of The Invention

In accordance with the present invention, I remove the effects of the prompt residue from the input line of a telephone system by predicting or modeling the time-varying energy of the expected residue during successive sampling frames (occupying defined time intervals)over which the signal occurs and then subtracting that residue energy from the line input signal. In particular, I form an attenuation parameter that relates the prompt residue to the prompt itself. When the prompt has sufficient energy, i.e., its energy is above some threshold, the attenuation parameter is preferably the average difference in energy between the prompt and the prompt residue over some interval. When the energy of the prompt is below the stated threshold, the attenuation parameter may be taken as zero.

I then subtract from the line input signal energy at successive instants of time the difference between the prompt signal and the attenuation parameter. The latter difference is, of course, the predicted prompt residue for that particular moment of time. I thereafter compare the resultant value with a defined detection margin. If the resultant is above the defined margin, it is determined that a user response is present on the input line and appropriate action is taken. In particular, in the embodiment that I have constructed that is described herein, when the detection margin is reached or exceeded, I generate a prompt-termination signal which terminates the prompt. The user response may then reliably be processed.

The attenuation parameter is preferably continuously measured and updated, although this may not always be necessary. In one embodiment of the invention that I have implemented, I sample the prompt signal and line input signal at a rate of 8000 samples/second (for ordinary speech signals) and organize the resultant data into frames of 120 samples/frame. Each frame thus occupies slightly less than one-sixtieth of a second. Each frame is smoothed by multiplying it by a Hamming window and the average energy within the frame is calculated. If the frame energy of the prompt exceeds a certain threshold, and if user speech is not detected (using the procedure to be described below), the average energy in the current frame of the line input signal is subtracted from the prompt energy for that frame. The attenuation parameter is formed as an average of this difference over a number of frames. In one embodiment where the attenuation parameter is continuously updated, a moving average is formed as a weighted combination of the prior attenuation parameter and the current frame.

The difference in energy between the attenuation parameter as calculated up to each frame and the prompt as measured in that frame predicts or models the energy of the prompt residue for that frame time. Further, the difference in energy between the line input signal and the predicted prompt residue or prompt replica provides a reliable indication of the presence or absence of a user response on the input line. When it is greater than the detection margin, it can reliably be concluded that a user response (e.g., user speech) is present.

The detection system of the present invention is a dynamic system, as contrasted to systems which use a fixed threshold against which to compare the line input signal. Specifically, denoting the line input signal as $S_i$, the prompt signal as $S_p$, the attenuation parameter as $S_a$, the prompt replica as $S_r$, and the detection margin as $M_d$, the present invention monitors the input line and provides a detection signal indicating the presence of a user response when it is found that:

$$S_i - M_d > S_p - S_a = S_r$$

or $$S_i > M_d + S_p - S_a = M_d + S_r$$

The term $M_d + S_r$ in the above equation varies with the prompt energy present at any particular time, and comprises what is effectively a dynamic threshold against which the presence or absence of user speech will be determined.

In one implementation of the invention that I have constructed, the variables $S_i$, $S_p$ $S_a$ and $S_r$ are energies as measured or calculated during a particular time frame or interval, or as averaged over a number of frames, and $M_d$ is an energy margin defined by the user. The amplitudes of the respective energy signals, of course, define the energies, and the energies will typically be calculated from the measured amplitudes. The present invention allows the fixed margin $M_d$ to be smaller than would otherwise be the case, and thus permits detection of user signaling (e.g., user speech) at an earlier time than might otherwise be the case.

SPECIFIC DESCRIPTION OF THE INVENTION

A. Drawings

The foregoing and other and further objects and features of the invention will be more fully understood from reference to the following detailed description of the invention, when taken in conjunction with the accompanying drawings, in which.

B. Preferred Embodiment Of The Invention

Figure 1:
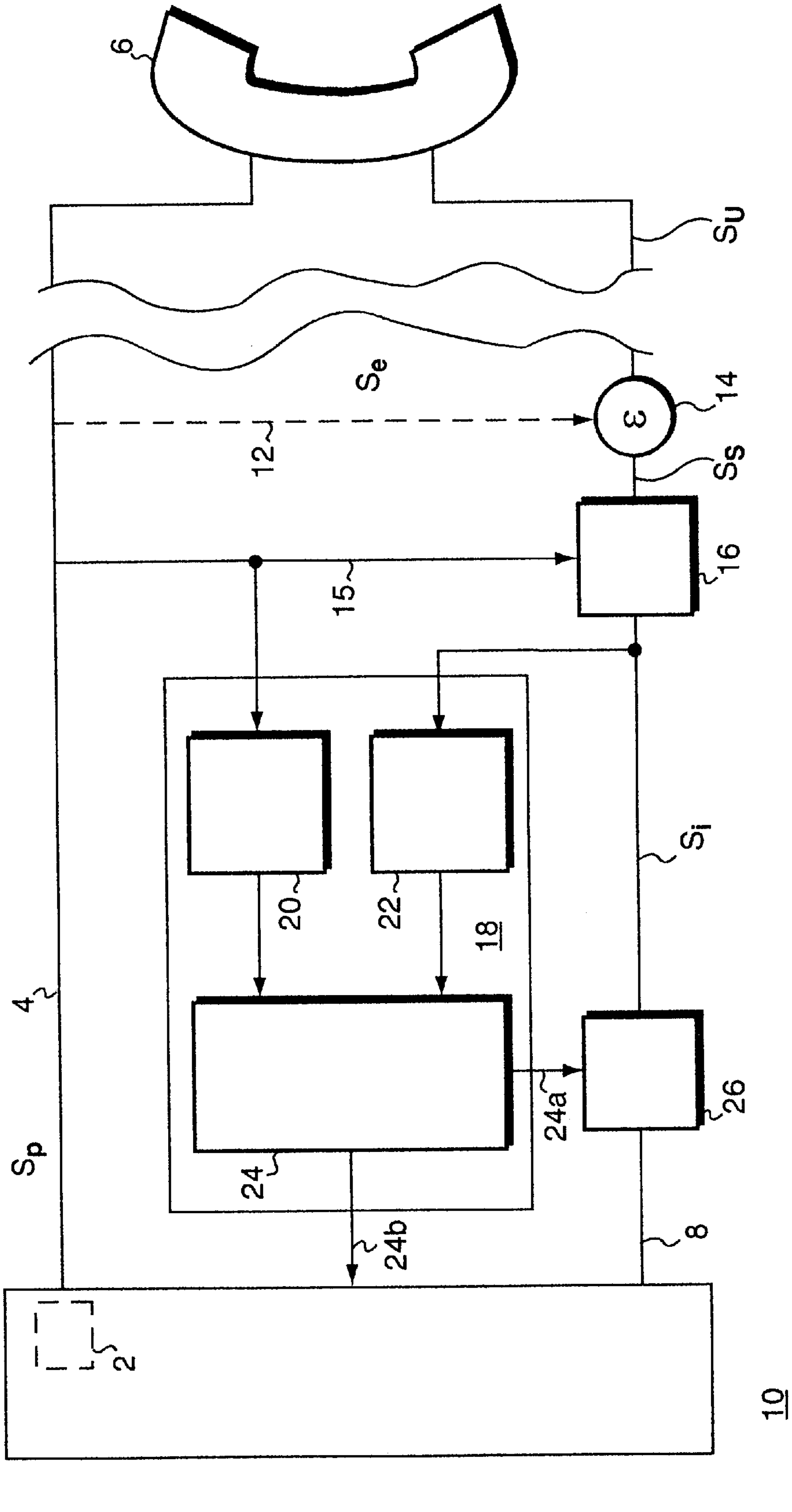
FIG. 1 is a block and line diagram of a speech recognition system using a telephone system and incorporating the present invention therein.

In FIG. 1, a speech recognition system 10 for use with conventional public telephone systems includes a prompt generator which provides a prompt signal $S_p$ to an outgoing telephone line 4 for transmission to a remote telephone handset 6. A user (not shown) at the handset 6 generates user signals $S_u$ (typically voice signals) which are returned (after processing by the telephone system) to the system 10 via an incoming or input line. The signals on line 8 are corrupted by line noise, as well as by the uncanceled portion of the echo $S_e$ of the prompt signal $S_p$ which is returned along a path (schematically illustrated as path 12), to a summing junction 14 where it is summed with the user signal $S_u$ to form the resultant signal, $S_s = S_u + S_e$.

The signal $S_s$ is the signal that would normally be input to the system 10 from the telephone system, that is, that portion of FIG. 1 including the summing junction 14 and the circuitry to the right of it. However, as is commonly the case in speech recognition systems, a local echo cancellation unit 16 is provided in connection with the recognizer 10 in order to suppress the prompt echo signal $S_e$. It does this by subtracting from the return signal $S_s$ a signal comprising a time varying function calculated from the prompt signal $S_p$ that is applied to the line at the originating end (i.e., the end at which the signal to be suppressed originated). The resultant signal, $S_i$, is input to the recognition system.

While the local echo cancellation unit does diminish the echo from the prompt, it does not entirely suppress it, and a finite residue of the prompt signal is returned to the recognition system via input line 8. Human users are generally able to deal with this quite effectively, readily distinguishing between their own speech, echoes of earlier speech, line noise, and the speech of others. However, a speech recognition system has difficulty in distinguishing between user speech and extraneous signals, particularly when these signals are speech-like, as are the speech prompts generated by the system itself.

In accordance with the present invention, a "barge-in" detector 18 is provided in order to determine whether a user is attempting to communicate with the system 10 at the same time that a prompt is being emitted by the system. If a user is attempting to communicate, the barge-in detector detects this fact and signals the system 10 to enable it to take appropriate action, e.g., terminate the prompt and begin recognition (or other processing) of the user speech. The detector 18 comprises first and second elements 20, 22, respectively, for calculating the energy of the prompt signal $S_p$ and the line input signal $S_i$, respectively. The values of these calculated energies are applied to a "beginning-of-speech" detector 24 which repeatedly calculates an attenuation parameter $S_a$ as described in more detail below and decides whether a user is inputting a signal to the system 10 concurrent with the emission of a prompt. On detecting such a condition, the detector 24 activates line 24*a* to open a gate 26. Opening the gate allows the signal $S_i$ to be input to the system 10. The detector 24 may also signal the system 10 via a line 24*b* at this time to alert it to the concurrency so that the system may take appropriate action, e.g., stop the prompt, begin processing the input signal $S_i$, etc.

Detector 18 may advantageously be implemented as a special purpose processor that is incorporated on telephone line interface hardware between the speech recognition system 10 and the telephone line. Alternatively, it may be incorporated as part of the system 10. Detector 18 is also readily implemented in software, whether as part of system 10 or of the telephone line interface, and elements 20, 22, and 24 may be implemented as software modules.

Figure 2:
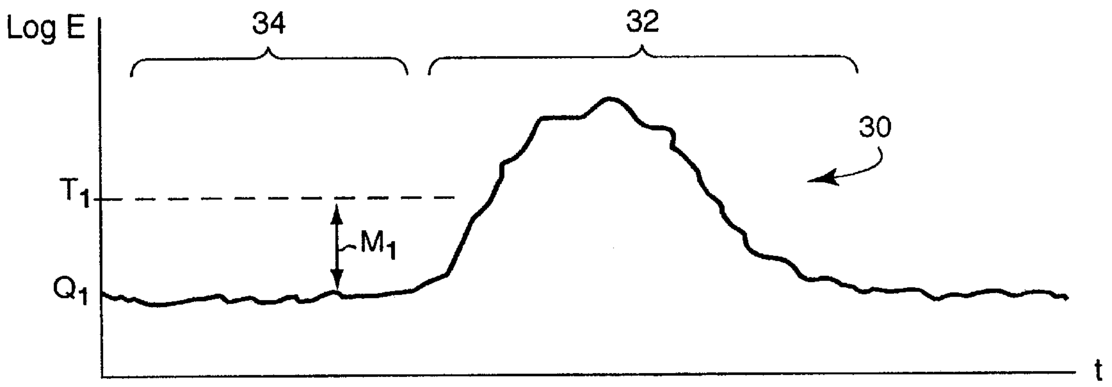
FIG. 2 is a diagram of the energy of a user's speech signal on a telephone line not having a concurrent system-generated outgoing prompt.

FIG. 2 illustrates the energy E (logarithmic vertical axis) as a function of time t (horizontal axis) of a hypothetical signal at the line input 8 of a speech recognition system in the absence of an outgoing prompt. The input signal 30 has a portion 32 corresponding to user speech being input to the system over the line, and a portion 34 corresponding to line noise only. The noise portion of the line energy has a quiescent (speech-free) energy $Q_1$, and an energy threshold $T_1$, greater than $Q_1$, below which signals are considered to be part of the line noise and above which signals are considered to be part of user speech applied to the line. The distance between $Q_1$ and $T_1$ is the margin $M_1$ which affects the probability of correctly detecting a speech signal.

Figure 3:
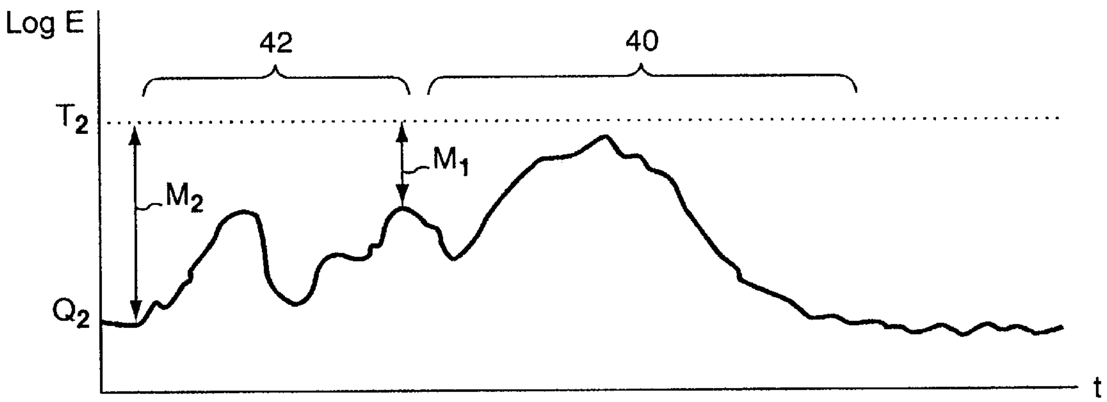
FIG. 3 is a diagram of the energy of a user's speech signal on a telephone line having a concurrent system-generated outgoing prompt which has been processed by echo cancellation.

FIG. 3, in contrast, illustrates the energy of a similar system which incorporates outgoing prompts and local echo cancellation. A signal 38 has a portion 40 corresponding to user speech (overlapped with line noise and prompt residue) being input to the system over the line, and a portion 42 corresponding to line noise and prompt residue only. The noise and echo portion of the line energy has a quiescent energy $Q_2$, and a threshold energy $T_2$, greater than $Q_2$, below which signals are considered to be part of the line noise and echo, and above which signals are considered to be part of user speech applied to the line. The distance between $Q_2$ and $T_2$ is the margin $M_2$. It will be seen that the quiescent energy level $Q_2$ is similar to the quiescent energy level $Q_1$ but that the dynamic range of the quiescent portion of the signal is significantly greater than was the case without the prompt residue. Accordingly, the threshold $T_2$ must be placed at a higher level relative to the speech signal than was previously the case without the prompt residue, and the margin $M_2$ is greater than $M_1$. Thus, the probability of missing the onset of speech (i.e., the early portion of the speech signal in which the amplitude of the signal is rising rapidly) is increased. Indeed, if the speech energy is not greater than the quiescent energy level by an amount at least equal to the margin $M_1$ (the case indicated in FIG. 3), it will not be detected at all.

Figure 4:
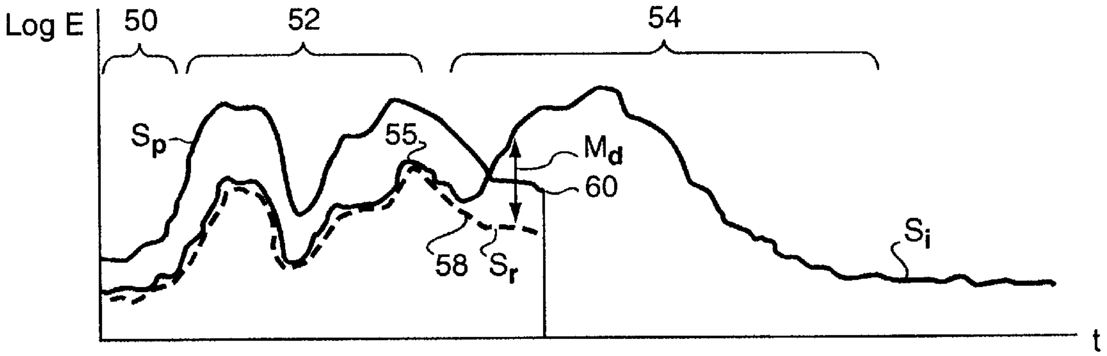
FIG. 4 is a diagram showing the formation and utilization of a prompt replica in accordance with the present invention.

Turning now to FIG. 4, illustrative signal energies for the method and apparatus of the present invention are illustrated. In particular, a prompt signal $S_p$ is applied to outgoing telephone line 4 (FIG. 1) and subsequently returned at a lower energy level on the input line 8. The line signal $S_i$ carries line noise in a portion 50 of the signal; line noise plus prompt residue in a portion 52; and line noise, prompt residue, and user speech in a portion 54. For purposes of illustration, the user speech is shown beginning at a point 55 of $S_i$.

In accordance with the present invention, a predicted replica or model $S_r$ (shown in dotted lines and designated by reference numeral 58) of the prompt echo residue resulting from the prompt signal $S_p$ is formed from the signals $S_p$ and $S_i$ by sampling them over various intervals during a session and forming the energy difference between them to thereby define an attenuation parameter $S_a=S_p-S_i$. In particular, the line input signal is sampled during the occurrence of a prompt and in the absence of user speech (e.g., region 52 in FIG. 4), preferably during the first 200 milliseconds of a prompt and after the input line has been "quiet" (no user speech) for a preceding short time. If these conditions cannot be satisfied during a particular interval, the previously-calculated attenuation parameter should be used for the particular frame. Desirably, the energy of the prompt should exceed at least some minimum energy level in order to be included; if the latter condition is not met, the attenuation parameter for the current frame time may simply be set equal to zero for the particular frame.

As shown in FIG. 4, the replica closely follows $S_i$ during intervals when user speech is absent, but will significantly diverge from $S_i$ when speech is present. The difference between $S_r$ and $S_i$ thus provides a sensitive indicator of the presence of speech even during the playing of a prompt.

For example, in accordance with one embodiment of the invention that I have implemented, the prompt signal and input line signal are sampled at the rate of 8000 samples/second for ordinary speech signals, the samples being organized in frames of 120 samples/frame. Each frame is smoothed by a Hamming window, the energy is calculated, and the difference in energy between the two signals if determined. The attenuation parameter $S_a$ is calculated for each frame as a weighted average of the attenuation parameter calculated from prior frames and the energy differences of the current frame. For example, in one implementation, I start with an attenuation parameter of zero and successively form an updated attenuation parameter by multiplying the most recent prior attenuation parameter by 0.9, multiplying the current attenuation parameter (i.e., the energy difference between the prompt and line signals measured in the current frame) by 0.1, and adding the two.

In the preferred embodiment of the invention, the attenuation parameter is continuously updated as the discourse progresses, although this may not always be necessary for acceptable results. In updating this parameter, it is important to measure it only during intervals in which the prompt is playing and the user is not speaking. Accordingly, when user speech is detected or there is no prompt, updating temporarily halts.

The attenuation parameter is thereafter subtracted from the prompt signal $S_p$ to form the prompt replica $S_r$ when $S_p$ has significant energy, i.e., exceeds some minimum threshold. When $S_p$ is below this threshold, $S_r$ is taken to be the same as $S_p$.In accordance with the present invention, the determination of whether a speech signal is present at a given time is made by comparing the line input signal $S_i$ with the prompt replica $S_r$. When the energy of the line input signal exceeds the energy of the prompt replica by a defined margin, i.e., $S_i-S_r>M_d$, it can confidently be concluded that user speech is present on the line. The margin $M_d$ can be lower than that of $M_2$ in FIG. 2, while still reliably detecting the beginning of user speech. Note that the margin $M_d$ may be set comparable to that of FIG. 1, and thus the onset of speech can be detected earlier than was the case with FIG. 2. However, user speech will be most clearly detectable during the energy troughs corresponding to pauses or quiet phonemes in the prompt signal. At such times, the energy difference between the line input signal and the prompt replica will be substantial. Accordingly, the speech signal will be detected early in the time at or immediately following onset. On detection of user speech, the prompt signal is terminated, as indicated at 60 in FIG. 4, and the system can begin operating on the user speech.

In the preceding discussion, I have described my invention with particular reference to voice recognition systems, as this is an area where it can have significant impact. However, my invention is not so restricted, and can advantageously be used in general to detect any signals emitted by a user, whether or not they strictly comprise "speech" and whether or not a "recognizer" is subsequently employed. Also, the invention is not restricted to telephone-based systems. The prompt, of course, may take any form, including speech, tones, etc. Further, the invention is useful even in the absence of local echo cancellation, since it still provides a dynamic threshold for determination of whether a user signal is being input concurrent with a prompt.

CONCLUSION

From the foregoing it will be seen that the "barge-in" of a user in response to a telephone prompt can effectively be detected early in the onset of the speech, despite the presence of imperfectly canceled echoes of an outgoing prompt on the line. The method of the present invention is readily implemented in either software or hardware or in a combination of the two, and can significantly increase the accuracy and responsiveness of speech recognition systems.

It will be understood that various changes may be made in the foregoing without departing from either the spirit or the scope of the present invention, the scope of the invention being defined with particularity in the following claims.

What is claimed is:

1. A telephone line interface card comprising:

means for coupling the line card to at least one telephone line allowing the line card to receive a line signal indicative of user speech;

means for transmitting prompts to a user on the at least one telephone line; and means for detecting the presence of user speech on the at least one telephone line concurrent with the transmission of a prompt, the detecting means comprising:

means for measuring a prompt residue resulting from imperfect cancellation of the prompt during at least a portion of a first interval in which said prompt residue is present and said speech is absent;

means for forming, over a subsequent interval, a prompt residue model based on said prompt and the measured residue; and means for providing an indication of the presence of speech on the at least one telephone line when the signal on said at least one line differs from said prompt residue model by a threshold.

2. The telephone line interface card of claim 1 further comprising means for time-varying the threshold.

3. The telephone line interface card of claim 1 wherein the measuring means measures the difference in amplitude between the prompt and the line signal in the absence of user speech.

4. The telephone line interface card of claim 1 wherein the measuring means measures the difference in energy between the prompt and the line signal in the absence of user speech.

5. The telephone line interface card of claim 1 wherein the means for forming a prompt residue model includes means for subtracting the measured residue from the prompt.

6. A telephone line interface card comprising:

an input configured to couple the line card to at least one telephone line and to receive an input signal indicative of user speech;

a prompt generator configured to transmit prompts to a user on the at least one telephone line; and a barge-in detector configured to detect the presence of user speech on the input concurrent with the transmission of a prompt by the prompt generator, the barge-in detector comprising:

a residue detector configured to measure a prompt residue resulting from imperfect cancellation of the prompt during at least a portion of a first interval in which the prompt residue is present and the speech is absent; and a beginning-of-speech detector coupled to the residue detector and configured to, over a subsequent interval, form a prompt residue model based on the prompt and the measured residue, and further configured to provide an indication of the presence of speech on the input when the input signal differs from the prompt residue model by a threshold.

7. The telephone line interface card of claim 6 further comprising a threshold device configured to vary the threshold over time.

8. The telephone line interface card of claim 7 wherein the beginning-of-speech detector is configured to calculate the difference in amplitude between the prompt and the input signal in the absence of user speech.

9. The telephone line interface card of claim 6 wherein the beginning-of-speech detector is configured to calculate the difference in energy between the prompt and the input signal in the absence of user speech.

10. The telephone line interface card of claim 6 wherein the beginning-of-speech detector is configured to subtract the measured residue from the prompt.

11. A telephone line interface card comprising:

an input configured to couple the line card to at least one telephone line and to receive an input signal indicative of user speech;

a prompt generator configured to transmit prompts to a user on the at least one telephone line; and a barge-in detector configured to detect the presence of user speech on the input concurrent with the transmission of a prompt by the prompt generator, the barge-in detector comprising:

a residue detector configured to measure a prompt residue resulting from imperfect cancellation of the prompt during at least a portion of a first interval in which the prompt residue is present and the speech is absent; and means for forming, over a subsequent interval, a prompt residue model based on the prompt and the measured residue;

wherein the barge-in detector is configured to provide an indication of the presence of speech on the input when the input signal differs from the prompt residue model by a threshold.

12. The telephone line interface card of claim 11 further comprising a threshold device configured to vary the threshold over time.

13. The telephone line interface card of claim 12 wherein the means for forming the prompt residue model is configured to calculate the difference in amplitude between the prompt and the input signal in the absence of user speech.

14. The telephone line interface card of claim 13 wherein the means for forming the prompt residue model is configured to subtract the calculated difference from the prompt to form the prompt residue model.

15. The telephone line interface card of claim 11 wherein the means for forming the prompt residue model is configured to calculate the difference in energy between the prompt and the input signal in the absence of user speech.

16. The telephone line interface card of claim 11 wherein the means for forming the prompt residue model is configured to subtract the measured residue from the prompt.

* * * * *